(12) United States Patent
Harrison, III et al.

(10) Patent No.: US 7,117,490 B2
(45) Date of Patent: Oct. 3, 2006

(54) METHOD AND APPARATUS FOR DOING PROGRAM ANALYSIS

(75) Inventors: Williams L. Harrison, III, Brookline, MA (US); Cotton Seed, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 09/976,313

(22) Filed: Oct. 11, 2001

(65) Prior Publication Data

US 2003/0074652 A1    Apr. 17, 2003

(51) Int. Cl.
G06F 9/45    (2006.01)

(52) U.S. Cl. ..................................................... 717/156

(58) Field of Classification Search ................ 717/120, 717/124, 133, 151, 144–146, 155–159; 707/104.1, 707/206; 700/87, 266

See application file for complete search history.

(56) References Cited

U.S. PATENT DOCUMENTS

| | | | | |
|---|---|---|---|---|
| 5,107,418 A | * | 4/1992 | Cramer et al. | 717/155 |
| 5,448,737 A | * | 9/1995 | Burke et al. | 717/146 |
| 5,485,616 A | * | 1/1996 | Burke et al. | 717/133 |
| 5,535,394 A | * | 7/1996 | Burke et al. | 717/157 |
| 6,014,518 A | * | 1/2000 | Steensgaard | 717/154 |
| 6,173,444 B1 | * | 1/2001 | Archambault | 717/159 |

OTHER PUBLICATIONS

Pande et al., "Interprocedural Def-Use Association in C Programs", Proceedings of the symposium on Testing, analysis, and verification, pp. 139-153, Oct. 1991.*
Harrold et al., "Efficient Computation of Interprocedural Definition-Use Chains", ACM Transactions on Programming Languages and Systems (TOPLAS), vol. 16 Issue 2, Mar. 1994, pp. 175-204.*
Landi et al., "A Safe Approximate Algorithm for Interprocedural Pointer Aliasing", ACM SIGPLAN Notices, v.27 n. 7, p. 235-248, Jul. 1992.*
Lin-Pheng Ni et al., Flow-Sensitive Interprocedural Pointer Induced Alias Analysis, 1997, National Chung Cheng University, pp. 1-14, url: <www.cs.ccu.edu.tw/~naiwei/CTHPC97.pdf>.*

* cited by examiner

*Primary Examiner*—Kakali Chaki
*Assistant Examiner*—Tuan Vu
(74) *Attorney, Agent, or Firm*—Blakely, Sokoloff, Taylor & Zafman LLP

(57) ABSTRACT

The invention provides a method and apparatus for doing program analysis. According to embodiments of the invention program analysis comprises assigning an alias to each equivalence class of possibly overlapping memory accesses as defined by an alias analysis of an intermediate language program; and defining a definition-use relationship between statements in each equivalence class wherein definition statements which belong to the equivalence class reference the alias associated with that class, and wherein use statements which belong to the equivalence class reference the alias associated with for that class. The invention also provides a program analysis algorithm which utilizes a dependence flow graph having the property that the edge cardinality is independent of the definition-use of structure the program being analyzed.

8 Claims, 5 Drawing Sheets

AbstractValue Value [A];

For each alias M:

Value [M] = InitialValue (M)

Add the node corresponding to M to Q.

While Q is nonempty, do:

Let n be an element of Q. Remove n from Q.

If n corresponds to an alias, add the successors of n in G to Q

If n corresponds to a statement of the form (PUT A E1), do:

let V = Eval (E1)

if not (LE(V, Value [A])) then

Value [A] = JOIN (Value [A], V)

Add A to Q

FIGURE 4

METHOD AND APPARATUS FOR DOING PROGRAM ANALYSIS

FIELD OF THE INVENTION

This invention relates to program analysis. In particular, it relates to program analysis in optimizing compilers.

BACKGROUND

Many program analysis problems involve propagating abstract values, which are compile-time approximations of the actual values computed by a program. A convenient structure for doing program analysis includes a dependence flow graph wherein nodes in the graph represents statements in the program and there is an edge from each statement that defines (writes) a storage location to a statement that uses (reads) the storage location. When there are many definitions and uses of a storage location, the number of edges in such a dependence flow graph becomes large relative to the number of nodes. This affects both the storage and time required to perform a program analysis using the graph.

BRIEF DESCRIPTION OF THE DRAWINGS

FIG. 4 shows an algorithm for doing a value propagation program analysis according to one embodiment of the invention.

DETAILED DESCRIPTION

Figure 1:
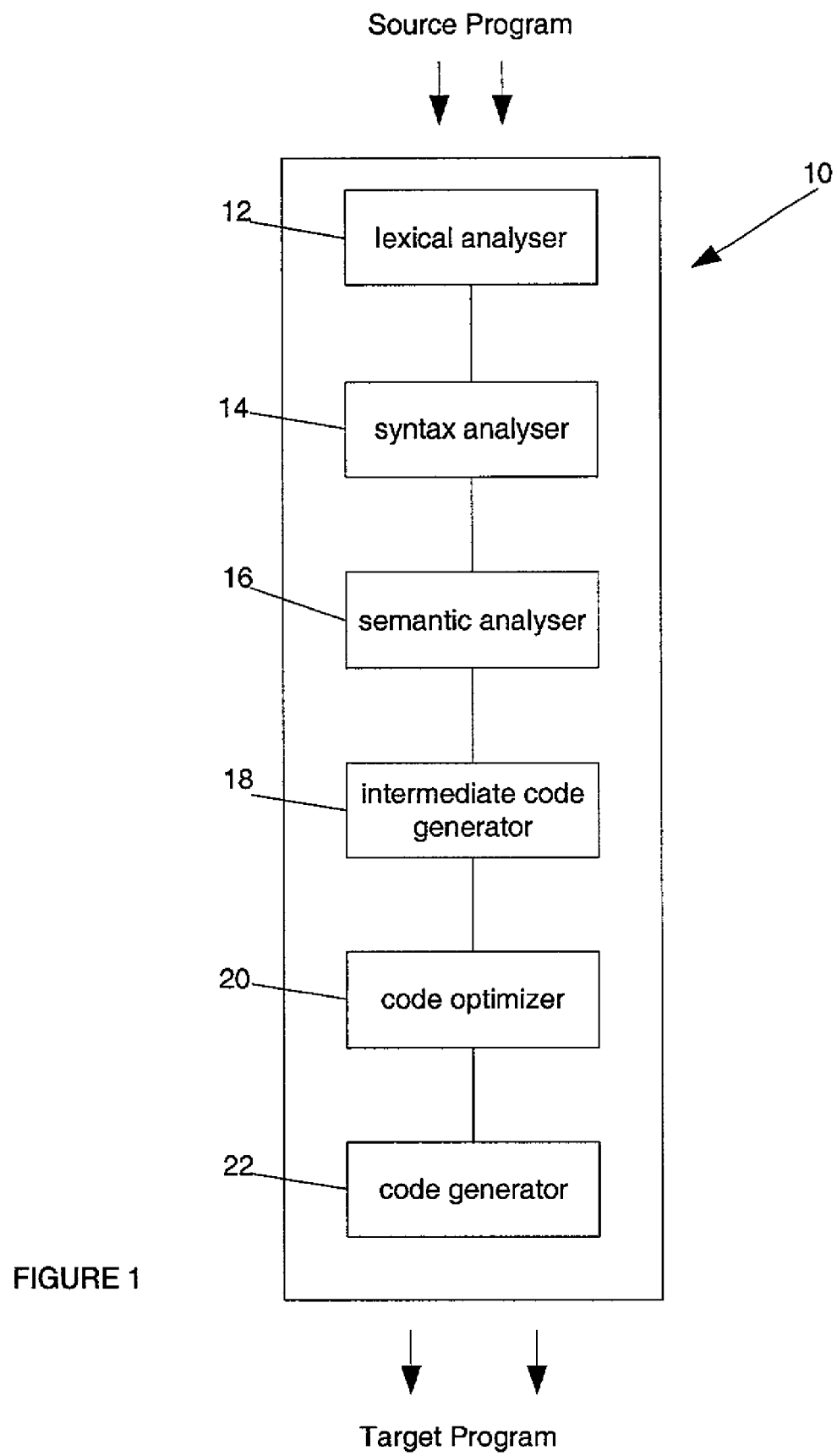
FIG. 1 shows a schematic drawing of an optimizing compiler in which embodiments of the invention may be practiced.

FIG. 1 of the drawings shows an optimizing compiler 10 in which embodiments of the invention may be practiced. The optimizing compiler 10 includes a lexical analyzer 12 which takes a source program and breaks it up to meaningful units called tokens. A syntax analyzer 14 determines the structure of the program and of the individual statements therein by grouping the tokens into grammatical phrases which are then checked by a semantic analyzer 16 for semantic errors. The compiler 10 further includes an intermediate code generator 18 which generates an intermediate program representation of the source program in an intermediate language. A code optimizer 20 attempts to optimize the program representation. The final phase of the compiler 10 is carried out by a code generator 22 which generates target comprising machine or assembly code.

In determining what optimizations to make, the code optimizer 20 performs a value analysis of the intermediate language program. Examples of such analysis include constant propagation, range analysis of subscript values, and type inference in dynamically typed programs.

The present invention permits value analysis problems to be solved over large input programs without excessive time or space penalties. In particular, program analysis according to embodiments of the invention, includes constructing dependent flow graphs in which the number of edges in the dependence flow graph is linear to the number of nodes in the graph, i.e. there are a constant number of edges per node. Embodiments of the invention make use of an equivalence class-based alias analysis of the intermediate language program to create dependence flow graphs which have the property that the edge cardinality is independent of the definition-use structure of the program being analyzed. An equivalence class is a class of overlapping memory accesses.

For purposes of describing the present invention, it is assumed that assignment statements in the intermediate language have the following syntax:

E: (PUT V E)
| (INTEGER Z)
| (ADD E E)
| (SUB E E)
| (GET V)
V: variable
Z: integer It is assumed further that INTEGER, ADD, SUB, and GET expressions all have the same type; the exact nature of the type (e.g., how many bits) is irrelevant. An assignment statement must be a PUT expression, and a PUT expression cannot be the subexpression of another subexpression.

(PUT V E): This statement writes a value to a variable. The expression E gives the value which is written to the location. V specifies a variable. It is assumed that variables are named by integers, and that other than to distinguish one variable from another, these integer names have no significance. It is also assumed that there is no aliasing or overlap among the variables used in PUT and GET expressions.

(INTEGER Z): This is the expression for an integer constant. Z is an integer literal that gives the value of the constant.

(ADD E E): This expression returns the sum of its arguments.

(SUB E E): This expression returns the difference of its arguments.

(GET V): This expression reads from the variable named by V and returns its value.

Only the syntax for the assignment statements of the intermediate language (the PUT expressions) have been shown in the above example. The reason for this is that only the PUT expressions are necessary to describe flow-insensitive program analysis in accordance with the present invention. However, it will be appreciated that a realistic intermediate language will include control flow constructs and other operators, not necessary for the present description.

Figure 2:
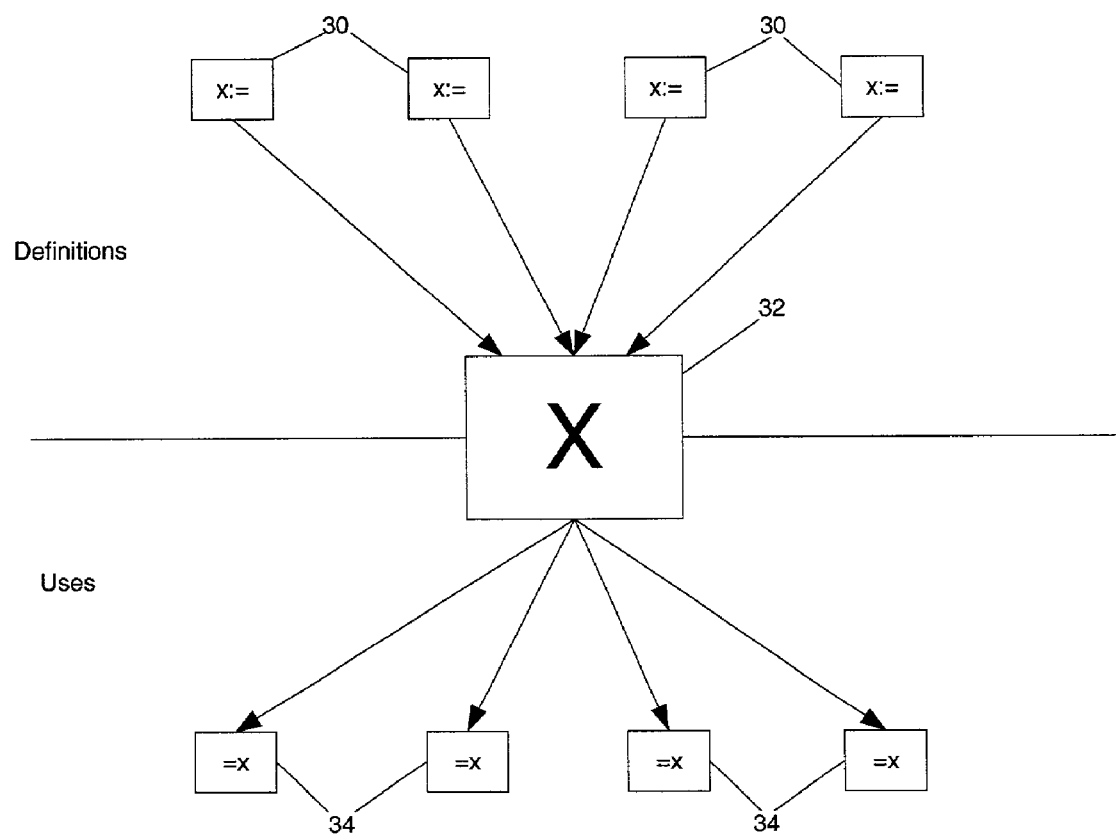
FIG. 2 shows a schematic drawing of a dependence flow graph constructed in accordance with one embodiment of the invention.

FIG. 2 of the drawings shows a dependence flow graph constructed in accordance with one embodiment of the invention. In constructing the dependence flow graph shown in FIG. 2, the PUT and GET expressions in the program are labeled with an alias. An alias, as used herein, is an equivalence class of PUT and GET expressions. An equivalence relation over aliases has the property that if there is a program execution in which two PUT and/or GET expressions in the program access the same storage location during that execution, then the two PUT and/or GET expressions have the same alias number. In other words, the equivalence relation over aliases summarizes the dependence structure of the program. Any alias analysis technique that produces such a labeling of the PUT and GET expressions of the program may be used for purposes of the present invention. In FIG. 2 statements in the program text which define a storage location X (in other words the PUTs to X in the program text) each form a node 30 in the dependence flow graph. Each statement in the program which uses memory location X (in other words expressions which GET x in the program text) forms a node 34 in the graph. A node for the aliases over the PUTs and GETs in the program text is represented by reference numeral 32. It will be seen that there is a single edge in the graph from each node 30 to node 32 and from each node 34 to node 32. In essence, the alias node 32 separates the definition-use structure of the program text.

Figure 3:
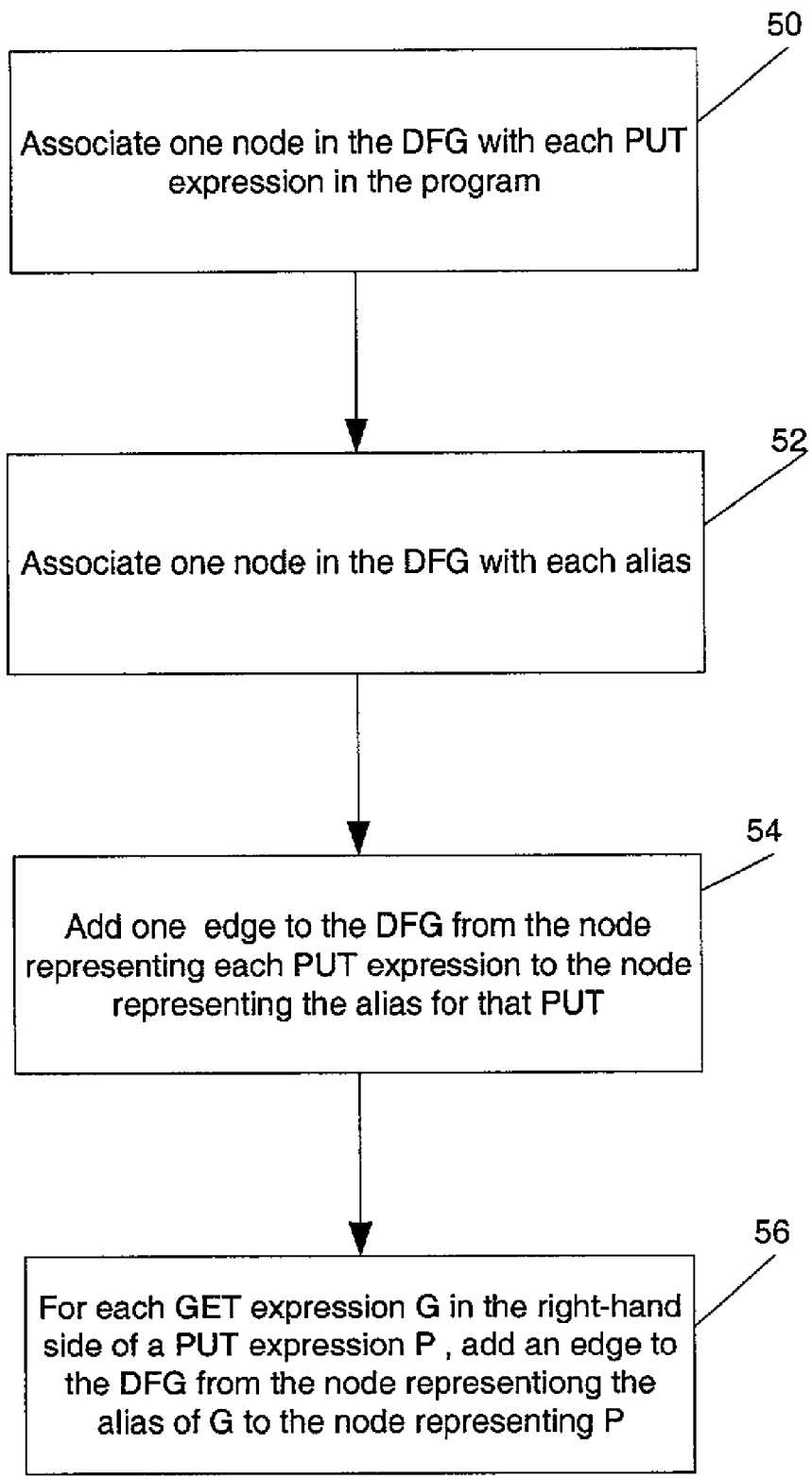
FIG. 3 shows a flowchart of a method for constructing a dependence flow graph according to one embodiment of the invention.

The process of constructing a dependence flow graph such as the one shown in FIG. 2 of the drawings is illustrated in a flow chart shown in FIG. 3 of the drawings. Referring to FIG. 3, at block 50 one node in the dependence flow graph (DFG) is associated with each PUT expression in the program. At block 52 one node in the DFG is associated with each alias in the program. At block 54 an edge is added to the DFG from the node representing each PUT expression to the node representing the alias for that put. Finally, at block 56, for each GET expression G in the right hand side of the PUT expression P, an edge is added to the dependence flow graph from the node representing the alias of G to the node representing P. A dependence flow graph constructed in accordance with the above method will have at most one edge for each PUT and GET expression in the program.

FIG. 4 of the drawings shows an algorithm, in pseudocode, to perform a flow insensitive program analysis, in accordance with one embodiment of the invention. Referring to the algorithm, A is equal to the number of aliases associated with the GETs and PUTs of the program. G is a dependence flow graph defined in accordance with the above method and Q is a set of nodes of G, which is initially empty. The algorithm assigns an abstract value to each alias in the dependence flow graph. It is assumed that the abstract value from a joint complete partial order, and that for two abstract values $V_1$ and $V_2$, the expression LE $(V_1, V_2)$ returns true if $V_1$ is less than or equal to $V_2$ in the partial order. The expression JOIN $(V_1, V_2)$ returns the JOIN of $V_1$ and $V_2$ in the partial order. E1 is an expression in the program and Eval (E1) returns the value of E1. For each memory alias, M, the expression Initial Value (M) returns an abstract value that is a safe approximation of the initial contents of the storage location (s) represented by M.

Figure 5:
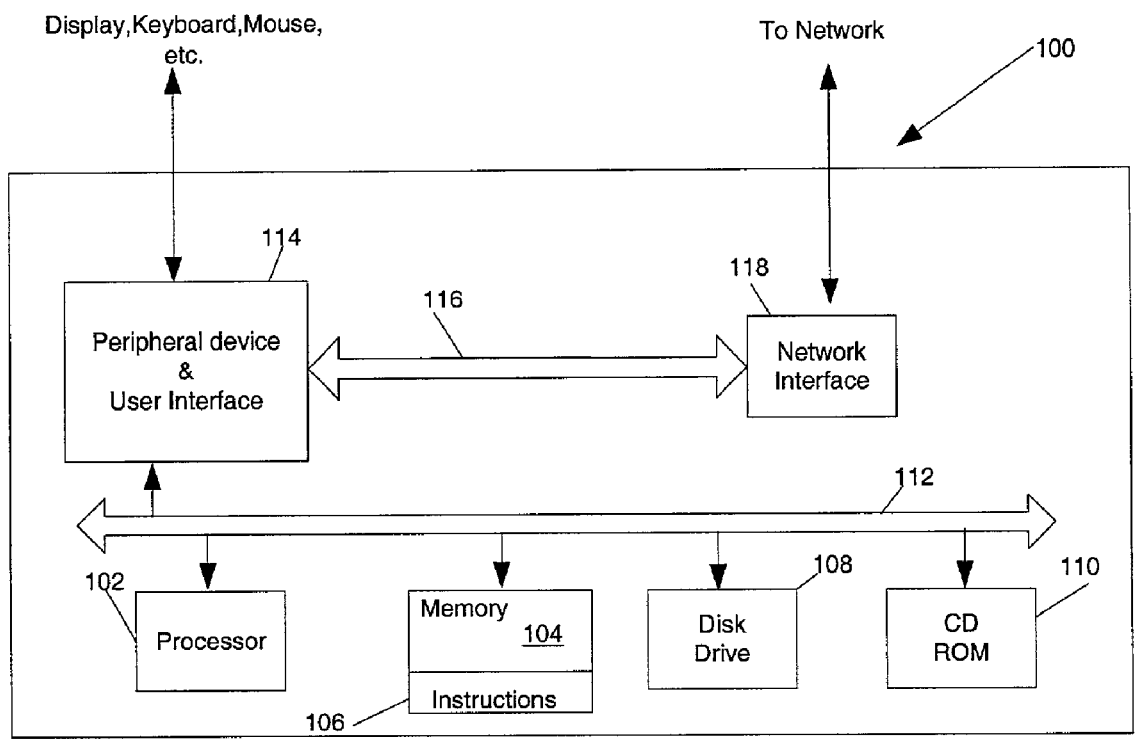
FIG. 5 shows a schematic drawing of hardware for performing program analysis in accordance with the invention.

Referring to FIG. 5 of the drawings reference numeral 100 generally indicates hardware for performing program analysis in accordance with the invention. The hardware 100 includes a memory 104, which may represent one or more physical memory devices, which may include any type of random access memory (RAM) read only memory (ROM) (which may be programmable), flash memory, non-volatile mass storage device, or a combination of such memory devices. The memory 104 is connected via a system bus 112 to a processor 102. The memory 104 includes instructions 106 which when executed by the processor 102 cause the processor to perform the methodology of the invention as discussed above. Additionally the system 100 includes a disk drive 108 and a CD ROM drive 110 each of which is coupled to a peripheral-device and user-interface 114 via bus 112. Processor 102, memory 104, disk drive 108 and CD ROM 110 are generally known in the art. Peripheral-device and user-interface 114 provides an interface between system bus 112 and various components connected to a peripheral bus 116 as well as to user interface components, such as display, mouse and other user interface devices. A network interface 118 is coupled to peripheral bus 116 and provides network connectivity to system 100.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A computer-implemented method, comprising:
    assigning a definition-node for one or more definition statements in an intermediate language program;
    assigning a use-node for one or more use statements in the intermediate language program;
    performing a memory alias analysis of the intermediate language program to partition memory accesses into equivalence classes such that any two memory accesses that reference the same storage location belong to the same equivalence class;
    assigning an alias-node for one or more aliases representing the equivalence class of the memory accesses;
    introducing an edge into a dependence flow graph connecting each definition-node to the alias-node corresponding to the alias representing the equivalence class to which the definition-node belongs;
    introducing an edge in the dependence flow graph connecting each use-node to the alias-node corresponding to the alias representing the equivalence class to which the use-node belongs; and
    performing a program analysis using the dependence flow graph by assigning, for each alias-node in the dependence flow graph, an initial value to the alias corresponding to the alias-node and adding the alias-node to a set of nodes;
    wherein a number of the edges in the dependence flow graph is linear to a number of the nodes in the dependence flow graph, and wherein the number of edges is independent of a definition-use structure of the intermediate language program;
    wherein the program analysis further comprises iteratively performing while the set of nodes is not empty;
    removing a node from the set of nodes;
        if the node is an alias-node, adding successors of the node in the dependence flow graph to the set of nodes; and
        if the node is a definition-node for a statement that defines a storage location:
            determining a value for an expression to be written to the storage location
            updating the initial value based on the value of the expression; and
            adding the storage location to the set of nodes.

2. The computer-implemented method of claim 1, wherein the initial value comprises a set of abstract values which forms a join-complete partial order.

3. A machine-readable medium that stores instructions, which when executed by a processor, cause the processor to perform operations comprising:
    assigning a definition-node for one or more definition statements in an intermediate language program;
    assigning a use-node for one or more use statements in the intermediate language program;
    performing a memory alias analysis of the intermediate language program to partition memory accesses into equivalence classes such that any two memory accesses that reference the same storage location belong to the same equivalence class;
    assigning an alias-node for one or more aliases representing the equivalence class of the memory accesses;
    introducing an edge into a dependence flow graph connecting each definition-node to the alias-node corresponding to the alias representing the equivalence class to which the definition-node belongs;
    introducing an edge in the dependence flow graph connecting each use-node to the alias-node corresponding to the alias representing the equivalence class to which the use-node belongs; and
    performing a program analysis using the dependence flow graph by assigning, for each alias-node in the dependence flow graph, an initial value to the alias corresponding to the alias-node and adding the alias-node to a set of nodes;
    wherein a number of the edges in the dependence flow graph is linear to a number of the nodes in the dependence flow graph, and wherein the number of edges is independent of a definition-use structure of the intermediate language program;
    wherein the program analysis further comprises iteratively performing while the set of nodes is not empty:
        removing a node from the set of nodes;
        if the node is an alias-node, adding successors of the node in the dependence flow graph to the set of nodes; and
        if the node is a definition-node for a statement that defines a storage location:
            determining a value for an expression to be written to the storage location;
            updating the initial value based on the value of the expression; and
    adding the storage location to the set of nodes.

4. The machine-readable medium of claim 3, wherein the initial value comprises a set of abstract values which forms a join-complete partial order.

5. An apparatus, comprising:
    a memory;
    a processor coupled to the memory and having a set of instructions which when executed by the processor cause the processor to perform operations comprising:
        assigning a definition-node for one or more definition statements in an intermediate language program;
        assigning a use-node for one or more use statements in the intermediate language program;
        performing a memory alias analysis of the intermediate language program to partition memory accesses into equivalence classes such that any two memory accesses that reference the same storage location belong to the same equivalence class;
        assigning an alias-node for one or more aliases representing the equivalence class of the memory accesses;
        introducing an edge into a dependence flow graph connecting each definition-node to the alias-node corresponding to the alias representing the equivalence class to which the definition-node belongs;
        introducing an edge in the dependence flow graph connecting each use-node to the alias-node corresponding to the alias representing the equivalence class to which the use-node belongs; and
        performing a program analysis using the dependence flow graph by assigning, for each alias-node in the dependence flow graph, an initial value to the alias corresponding to the alias-node and adding the alias-node to a set of nodes;
        wherein a number of the edges in the dependence flow graph is linear to a number of the nodes in the dependence flow graph, and wherein the number of edges is independent of a definition-use structure of the intermediate language program;
        wherein the program analysis further comprises iteratively performing while the set of nodes is not empty:
    removing a node from the set of nodes;
        if the node is an alias-node, adding successors of the node in the dependence flow graph to the set of nodes; and
        if the node is a definition-node for a statement that defines a storage location:
            determining a value for an expression to be written to the storage location;
            updating the initial value based on the value of the expression; and
            adding the storage location to the set of nodes.

6. The apparatus of claim 5, wherein the initial value comprises a set of abstract values which forms a join-complete partial order.

7. An computer-implemented apparatus, comprising:
    means for assigning a definition-node for one or more definition statements in an intermediate language program;
    means for assigning a use-node for one or more use statements in the intermediate language program;
    means for performing a memory alias analysis of the intermediate language program to partition memory accesses into equivalence classes such that any two memory accesses that reference the same storage location belong to the same equivalence class;
    means for assigning an alias-node for one or more aliases representing the equivalence class of the memory accesses;
    means for introducing an edge into a dependence flow graph connecting each definition-node to the alias-node corresponding to the alias representing the equivalence class to which the definition-node belongs;
    means for introducing an edge in the dependence flow graph connecting each use-node to the alias-node corresponding to the alias representing the equivalence class to which the use-node belongs; and
    means for performing a program analysis using the dependence flow graph by assigning, for each alias-node in the dependence flow graph, an initial value to the alias corresponding to the alias-node and adding the alias-node to a set of nodes;
    wherein a number of the edges in the dependence flow graph is linear to a number of the nodes in the dependence flow graph, and wherein the number of edges is independent of a definition-use structure of the intermediate language program;

wherein the program analysis further comprises iteratively performing while the set of nodes is not empty:
  removing a node from the set of nodes;
  if the node is an alias-node, adding successors of the node in the dependence flow graph to the set of nodes; and
  if the node is a definition-node for a statement that defines a storage location:
    determining a value for an expression to be written to the storage location;
    updating the initial value based on the value of the expression; and
    adding the storage location to the set of nodes.

8. The apparatus of claim 7, wherein the initial value comprises a set of abstract values which forms a join-complete partial order.

* * * * *